United States Patent [19]

Matsuno et al.

[11] Patent Number: 5,084,221
[45] Date of Patent: Jan. 28, 1992

[54] PROCESS FOR MANUFACTURING A TWISTED FRP STRUCTURE

[75] Inventors: Shigehiro Matsuno, Gifu; Kenji Kozuka, Ichinomiya; Kazuo Yasuda, Gifu; Minoru Naito, Haguri, all of Japan

[73] Assignee: Ube-Nitto Kasei Co., Ltd., Tokyo, Japan

[21] Appl. No.: 435,812

[22] Filed: Nov. 13, 1989

[30] Foreign Application Priority Data

Dec. 28, 1988 [JP] Japan .................. 63-329163
Apr. 27, 1989 [JP] Japan .................. 1-105800

[51] Int. Cl.⁵ .................. B29C 53/14; B29C 47/02
[52] U.S. Cl. .................. 264/103; 156/149; 156/172; 156/180; 156/244.12; 264/1.5; 264/1.7; 264/137; 264/174; 264/211.12; 264/285; 264/295; 264/339; 264/231; 264/347; 425/114
[58] Field of Search .............. 264/137, 135, 103, 173, 264/174, 1.5, 1.7, 288.4, 289.3, 285, 211.12, 295, 339, 231, 347; 427/175, 434.6; 156/172, 244.12, 244.17, 244.19, 149, 180; 65/3.43, 3.44, 4.1; 425/112, 114; 174/114 R

[56] References Cited

U.S. PATENT DOCUMENTS

| | | | |
|---|---|---|---|
| 3,259,675 | 7/1966 | Bowers | 264/103 |
| 3,946,097 | 3/1976 | Takahashi et al. | 264/90 |
| 4,005,168 | 1/1977 | Whitfill, Jr. et al. | 264/103 |
| 4,039,743 | 8/1977 | Gommans | 174/114 R |
| 4,137,119 | 1/1979 | Piola | 156/172 |
| 4,219,522 | 8/1980 | Oyama | 264/279 |
| 4,289,465 | 9/1981 | Killmeyer et al. | 425/112 |
| 4,515,737 | 5/1985 | Karino et al. | 264/137 |
| 4,549,042 | 10/1985 | Akiba et al. | 174/114 R |
| 4,673,541 | 6/1987 | Watanabe et al. | 264/137 |
| 4,720,368 | 1/1988 | Nakasone et al. | 264/174 |
| 4,744,935 | 5/1988 | Priaroggia et al. | 264/103 |
| 4,770,834 | 9/1988 | Nakasone et al. | 264/137 |
| 4,975,232 | 12/1990 | Hattori et al. | 264/174 |

FOREIGN PATENT DOCUMENTS

| | | | |
|---|---|---|---|
| 54148087 | 11/1979 | Japan | 264/137 |
| 2067612 | 7/1981 | United Kingdom | 156/244.12 |

Primary Examiner—Jeffery Thurlow
Assistant Examiner—Mathieu Vargot
Attorney, Agent, or Firm—Wenderoth, Lind & Ponack

[57] ABSTRACT

A twisted FRP structure having sufficient strength and flexibility is produced by providing a rod member disposed centrally and twist a plurality of side strands twisted around the rod member in the same direction at a predetermined pitch. At least the side strand includes a composite strand having an FRP element from by impregnating fibers with an uncured thermosetting resin and a thermoplastic coating on such FRP element, the thermosetting resin being cured after the side strands are twisted around the rod member. The twisting pitch is not less than 25 times the outside diameter of the FRP element in the side strand.

8 Claims, 4 Drawing Sheets

PROCESS FOR MANUFACTURING A TWISTED FRP STRUCTURE

BACKGROUND OF THE INVENTION

1. Field of the Invention

This invention relates to a process for manufacturing a twisted structure of a fiber-reinforced synthetic resin material, the structure having high tensile strength and flexibility and being suitable for use as a tension member for a non-metallic optical cable or the like.

2. Description of Prior Art

In recent years, it has been deemed important to render communication cables free of induction and lighter in weight, and there has been a conspicuous trend toward the use of non-metallic cables in place of metallic cables. As a result, rod-shaped members made of fiber-reinforced synthetic resin material (hereinafter referred to as "FRP") with glass fibers or Aramid fibers have been used widely as tension members in cables.

However, an attempt to obtain a rod-shaped FRP member having a tensile strength comparable to that of metallic tension members (steel wires, stranded steel wires, etc.) involves use of a member having a larger outside diameter, resulting in the cables obtained having an excessively high stiffness with poor ability to be handled.

To overcome these problems, it has been proposed to twist a plurality of cured rectilinear FRP rods together so as to obtain flexibility while retaining a sufficient tensile strength. Such proposal, however, has proved that it is difficult to obtain a stable twisted structure because the strands constituting the structure tend to repel each other, thereby loosening the twist.

Also during the production of the twisted structure, it is necessary to wind the cured FRP rod as the strands on bobbins and to supply the rod while rotating the bobbins, which leads to a complicated stranding step and a high cost.

On the other hand, for obtaining a FRP rope member, there has been known a method in which reinforcing fibers are impregnated with an uncured thermosetting resin, the impregnated fibers are formed to have a predetermined outside diameter followed by coating with a thermoplastic resin to obtain a composite strand, and such strands are twisted together prior to the curing of the thermosetting resin.

The conventional method of manufacturing the above rope member by use of the composite strands, however, has had the following problems. Since the twisting of the strands and the curing of the thermosetting resin are carried out discontinuously in separate steps from the production of the uncured composite strands, difficulties occur regarding the storage stability of the uncured thermosetting resin and, further, offset or disorder of the arrangement of the reinforcing fibers in the composite strands tends to be caused during take-up of the strands of drums, bobbins, or the like, with lowering of physical properties after curing.

Accordingly, it is an object of the present invention to provide a process for manufacturing a twisted FRP structure having sufficient flexibility required in practical use as well as satisfactory strength.

It is another object of the invention to provide such a process which enables efficient manufacture of the FRP structure.

SUMMARY OF THE INVENTION

A twisted FRP structure produced according to the invention comprises a rod member disposed centrally and a plurality of side strands twisted around the rod member in the same direction at a predetermined pitch. At least each of the side strands comprises a composite strand having an FRP element formed by impregnating fibers with an uncured thermosetting resin and a thermoplastic coating on the FRP element, the thermosetting resin being cured after twisting of the composite strands around the rod member. The twisting pitch is not less than 25 times the outside diameter of the FRP element of each side strand.

In one embodiment of the invention, the rod member disposed centrally also comprises a composite strand, and the thermosetting resin therein is cured after the twisting of the side strands.

In another embodiment of the invention, the rod member disposed centrally includes a fiber-reinforced synthetic resin molding which is cured before the twisting of the side strands, and the center rod member may be an FRP pipe or an FRP-sheathed optical fiber.

The above-mentioned structure may further include a thermoplastic resin sheath at a peripheral portion thereof.

A process according to the invention for manufacturing the FRP structure includes the steps of: impregnating each of a plurality of strands comprising long fibers with an uncured thermosetting resin and forming the impregnated strands into predetermined shapes to obtain uncured FRP elements; passing each of the uncured FRP elements through a die portion of a melt extruder to provide an annular coating of a thermoplastic resin thereon; and cooling immediately the coatings to form composite strands with the FRP elements therein uncured. In a first process according to the invention, in succession to the cooling step for forming the composite strands, one of the composite strands is selected to be a center strand whereas the others are used as side strands, and the side strands are twisted around the center strand at a predetermined twisting pitch to thus form a twisted FRP composite. Finally, the FRP elements in all the composite strands are cured. On the other hand, a second process according to the invention includes a step of supplying a center strand comprising a preliminarily cured rod member made of a fiber-reinforced synthetic resin. According to the second process, in succession to the cooling step for forming the composite strands, the composite strands are twisted around the center strand at a predetermined twisting pitch to thus form a twisted FRP composite and then the FRP elements in the composite strands are cured.

In the first process mentioned above, the twisting of the composite strands is preferably carried out with a tension To on the side strands set to be less than a tension Tc on the center strand. In the above-mentioned second process, on the other hand, the twisting may be carried out under the condition where a tension T on the composite strands satisfies the equation: $T \geq (9000 \times W \times 0.05)/3$ (g), where W (g/m) is the unit weight of the reinforcing fiber used in the composite strands.

The curing of the FRP elements in the composite strands is preferably carried out at a temperature not higher than a softening point of the thermoplastic resin coating, whereby adhesion between the coating and the FRP element is prevented which would otherwise lower the flexibility of the structure.

In one embodiment of the structure obtained by a process according to the invention, a thermoplastic sheath is provided around the twisted FRP composite thus forming the twisted FRP structure. The sheath may be provided after the curing of the FRP element. If a liquid such as boiling water is used as a curing medium, however, water tends to be left between the twisted strands and to foam during molding of the sheath, resulting in deformation of the external shape of the product. Therefore, the sheath is preferably provided after the twisting of the composite strands and before the curing of the FRP elements.

Other objects, features and advantages of the invention will be apparent from the following description of preferred embodiments thereof when taken in conjunction with the accompanying drawings.

DESCRIPTION OF THE PREFERRED EMBODIMENTS

A twisted FRP structure produced according to this invention has a rod member disposed centrally, and a plurality of side strands twisted around the rod member in the same direction at a predetermined pitch. At least each of the side strands comprises a composite strand obtained by coating a thermoplastic resin on an FRP element which is formed by impregnating fibers with an uncured thermosetting resin, and the thermosetting resin in the FRP elements is cured after the composite strands are twisted around the central rod member. The reinforcing fiber may be any fiber which has a large tensile strength, typical examples thereof including long glass fibers, aromatic polyamide fibers, carbon fibers, etc. as well as nylon, polyester, Vinylon and other similar synthetic fibers. The content of the fibers in the FRP element is generally 50 to 75% by volume, preferably 55 to 70% by volume. A typical example of the thermosetting resin is an unsaturated polyester resin, but epoxy resins, phenolic resins and the like may also be used as the thermosetting resin.

The thermoplastic resin for coating the FRP element is selected from those thermoplastic resins which are suitable for coating by melt extrusion. Generally, polyethylene resins are preferable for this use, from the viewpoints of flexibility, low-temperature resistance, economy, etc., and polyamide resins are also preferable for such use because of the flexibility thereof.

The twisting pitch of the composite strands around the central rod member should be at least 25 times the outside diameter of the FRP element in the composite strands, in order to maintain physical properties of each strand such as strength. If the twisting pitch is less than 25 times the outside diameter of the FRP element, the FRP structure obtained would have poor flexibility and a modulus of elasticity in tension below 4,000 kg/mm$^2$, namely, below 80% of the modulus of elasticity of the composite strands cured in a rectilinear form, with a tensile strength lowering below 60% of that of the rectilinear strands. Such strength is believed to be unsatisfactory in practical use.

The central rod member may comprise a composite strand, as in the case of the side strands. In that case, the centrally located one of the composite strands is selected as a center strand, and the FRP element of both the center strand and the side strands are cured simultaneously. Alternatively, the central rod member may include a preliminarily cured fiber-reinforced synthetic resin molding. Where the structure is used as a tension member for supporting an optical fiber, a solid rod of fiber-reinforced synthetic resin is preferably employed as the central member. Where the structure is used as a pipe for an optical fiber, a pipe having an outer layer of fiber-reinforced synthetic resin may be employed. Further, where the structure is used in an armored-type optical fiber cable, the center member may comprise a fiber-reinforced synthetic resin coating enclosing, and in one body with, an optical fiber, optical fiber element or optical fiber unit.

In production of the above-mentioned twisted FRP structure, uncured composite strands are first prepared. The preparation of the uncured composite strands is carried out by substantially the same method as that disclosed in U.S. Pat. No. 3,946,097. Namely, each of a plurality of strands comprising long reinforcing fibers is impregnated with an uncured thermosetting resin and formed into a predetermined shape to obtain an uncured FRP element. Each of the FRP elements is passed through a die portion of a melt extruder to form an annular coating of a thermoplastic resin on the periphery thereof, immediately followed by cooling the coating. Thus, composite strands each having the uncured FRP element are produced. Where the central rod member comprises such a composite strand, the twisting is carried out in succession to the cooling step, in such a manner that the center strand and the side strands are first passed through a guide and then curing is carried out while twisting the side strands around the center strand in a heated reservoir disposed between the guides and a rotary twister. Alternatively, the twisting may be performed outside the reservoir, followed by curing in the reservoir. During twisting, it is preferable to arrange the strands in a manner that the tension To on the side strands is less than the tension Tc on the center strand, from the viewpoints of tensile strength and flexibility of the structure after cure.

On the other hand, where a rod member comprising a preliminarily cured fiber-reinforced synthetic resin molding is used as the central member, it is wound around a bobbin or the like and is supplied while rotating synchronously with the rotary twister. The rod member and the composite strands are passed through a guide, and then twisting and curing are carried out in the same manner as above. Where the preliminarily cured molding is used as the central member, it is preferable to set the tension T of the composite strands at the time of twisting so as to satisfy the equation:

$$T > (9000 \times W \times 0.05)/3 \qquad (g)$$

where W (g/m) is the unit weight of the reinforcing fiber used in the composite strands, in order to enhance physical properties such as modulus of elasticity in tension and tensile strength of the FRP structure produced.

The invention will now be described more in detail while referring to the following EXAMPLES and COMPARATIVE EXAMPLES.

EXAMPLE 1

Figure 1:
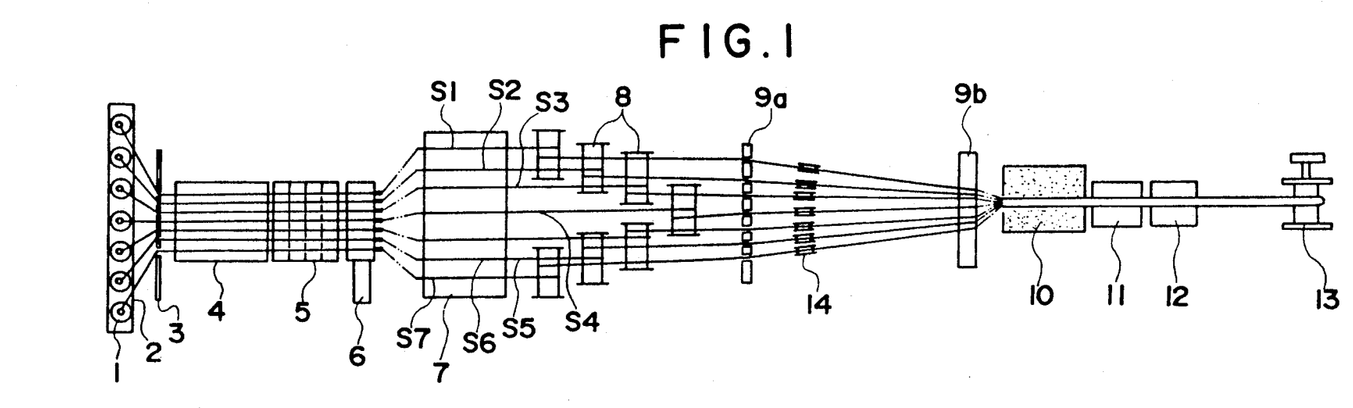
FIG. 1 is a plan view explanatory of a process according to an embodiment of the invention.
Figure 2:
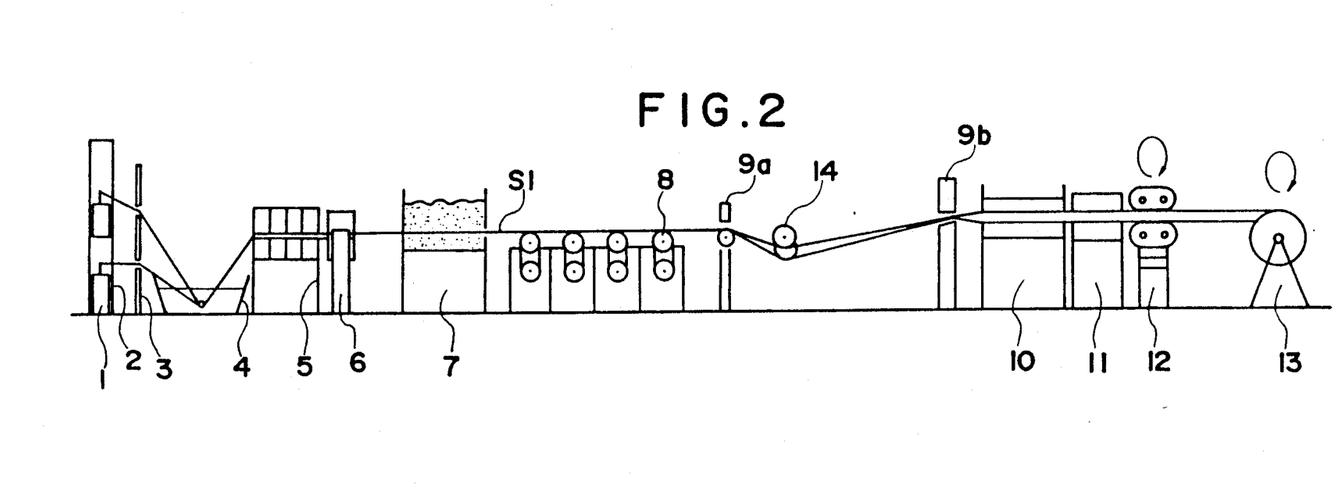
FIG. 2 is a side view thereof.

Referring to FIG. 1 and FIG. 2, in order to obtain a twisted FRP structure (1×7) comprising six side strands arranged around a center strand, glass fiber rovings (made by Nitto Boseki Co., Ltd., 280 tex) as reinforcing fibers 1 for the seven strands were placed on a shelf 2. The reinforcing fibers 1 were led through a guide 3 into a resin bath 4 filled with a mixture of an uncured unsaturated polyester resin (Ester H-8100, a product by Mitsui Toatsu Chemicals, Inc.) and a peroxide catalyst for curing, whereby the fibers 1 were impregnated with the resin. Then, the impregnated fibers were formed into uncured FRP elements with each 1.2 mm outside diameter. The uncured FRP elements were passed through die portions of a melt extruder 6 to provide, on each of the seven elements, an annular primary coating 16 (see FIG. 4) of a thermoplastic resin that was obtained by admixing a low density polyethylene, (MG211, a product by Nippon Unicar Co., Ltd.) with three parts of a black masterbatch. Immediately thereafter, the primary coatings 16 on the FRP elements were cooled in a cooling tank 7, to thereby obtain seven composite strands S1 to S7 each having the FRP element in the uncured state. At this state, the outside diameter of each composite strand was 1.5 mm. Subsequently, the composite strands S1 to S7 were twisted and cured in the manner as described below.

First, the composite strands S1 to S7 were wound around respective intermediate rollers 8. The strands S1 to S7 were passed through a preliminary guide 9a and a guide 9b and then led into a curing tank 10 filled with hot water which was controlled at a temperature of 95° C., followed by a hot air drier 11. Disposed downstream of the drier 11 was a rotary take-up device or twister 12 through which the strands were passed in such a manner that the rotational movement of twister 12 resulted in twisting the composite strands S1 to S3 and S5 to S7 around the central composite strand S4. Thus, after the twister 12 the strand S4 was a center strand and the six others were side strands.

For control of tensions on the strands S1 to S7, dancer rollers 14 for respective strands S1 to S7 were provided between the guide 9a and the guide 9b, and the dancer rollers were so controlled that the tension (Tc) on the strand S4 was 1 kg while the tension (To) on each of the strands S1-S3, S5-S7 was 0.3 kg.

A target of the twisting pitch for the composite strands was set at 60 mm, such value being equal to 40 times the outside diameter of the strand and being equal to 50 times the outside diameter of the uncured FRP element.

The FRP structure, thus obtained by twisting the composite strands simultaneously with curing the FRP elements therein in the curing tank 10, were taken up by a rotary take-up drum 13 having a bobbin and left for 24 hours at a temperature of 80° C. for postcuring.

Figure 4:
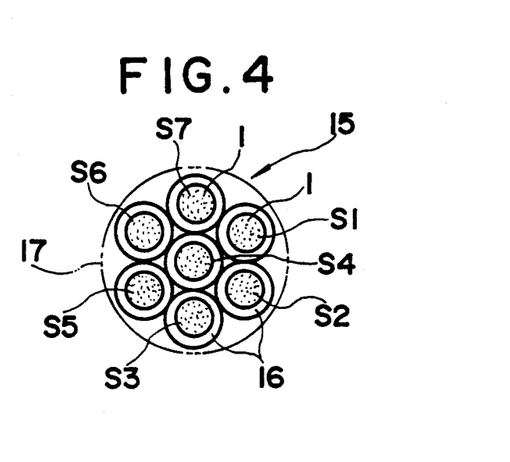
FIG. 4 is a sectional view of an FRP structure according to Example 1 of the invention.

A cross section of an FRP structure 15 produced by the above-mentioned process is shown in FIG. 4. The FRP structure had an apparent outside diameter of 4.5 to 4.6 mm, a twisting pitch of 60±10 mm, a glass fiber content in each FRP element of 65% by volume, and a unit weight of 21.8 g/m. Upon tests for measuring physical properties, the FRP structure was found to have a tensile tenacity or breaking tensile load of 880 to 950 kg, and a force necessary for 0.5% elongation was 200 kg. The tensile tenacity is lower by only about 30%, as compared with corresponding values calculated on the assumption that the composite strands S1 to S7 were bundled together in a rectilinear condition. Also, a modulus of elasticity in tension of the structure 15 was measured to be substantially equal to such a calculated value. For measurement of flexibility, a sample of 300 mm length was prepared from the FRP structure. The force required for bending the sample into a semicircular shape with a diameter of 200 mm (i.e. flexural rigidity) was 450 g, such value being about one-sixth of the flexural rigidity of a single rod-shaped FRP body having the same cross-sectional area. A diameter of a circle or semicircle obtained by bending the sample to the limit beyond which the sample broke (hereinafter referred to as "minimum bending diameter") was 95 mm.

Denoted by reference character 17 in FIG. 4 is a thermoplastic resin sheath constituting the outermost peripheral portion of the FRP structure, and which was formed in this example by the conventional method after the structure was passed through the rotary take-up device 12. Samples having the sheath 17 and an overall outside diameter of 5.5 mm were separately prepared, and subjected to measurement of the minimum bending diameter. The sample in which a low density polyethylene was used as the resin of the sheath had a minimum bending diameter of 75 mm, while the sample using nylon 12 for the sheath had a minimum bending diameter of 80 mm. Therefore, by providing the sheath, it is possible to further increase the flexibility of the FRP structure.

Formation of the sheath is preferably carried out after the twisting of the composite strands and before the curing of the FRP elements. In that case, the curing tank 10 and the drier 11 will be disposed on the downstream side of the rotary take-up device 12, and a melt extruder similar to the above-mentioned melt extruder 6 but having only one die portion and a cooling tank similar to the above-mentioned cooling tank 7 will be provided between the curing tank and the take-up device. The formation of the sheath prior to the curing of the FRP elements eliminates a possibility that water, which might otherwise be left between the side strands, would foam during molding of the sheath to result in deformation in the external appearance of the FRP structure obtained.

EXAMPLE 2

With a target value of twisting pitch set at 120 mm, and by using the same uncured composite strands S1 to S7 as those in Example 1, twisting and curing were carried out in the manner as follows.

Figure 3A:
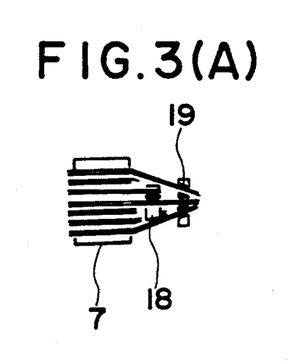
FIGS. 3(A) and 3(B) are schematic views showing another control means for tension on a composite strand.
Figure 3B:
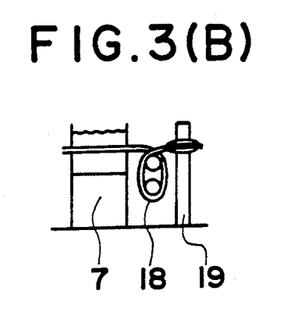

Of the uncured composite strands 1.5 mm in outside diameter which were continuously produced, only the center strand S4 was wound around a Nelson-type take-off roller 18 (FIG. 3(A) and 3(B)), and the center strand S4 as well as the side strands S1–S3, S5–S7 were passed through a guide 19. Thereafter, curing was carried out while twisting the strands in the same manner as in Example 1, the resultant FRP structure was taken up by the rotary take-up drum 13, and postcuring was carried out under the same conditions as in Example 1. Loads of the dancer rollers 14 were so controlled that during twisting the tension on the center strand S4 was 3 kg and the tension on each of the side strands S1–S3, S5–S7 was 1.5 kg.

The FRP structure thus obtained had an apparent outside diameter of 4.5 to 4.6 mm, a twisting pitch of 120±10 mm, and a unit weight of 21.6 g/m. Upon measurements of physical properties, the FRP structure was found to have a minimum bending diameter of 80 mm, a tensile tenacity or breaking tensile load of 840 to 1020 kg and a flexural rigidity of 450 g, while a force for 0.5% elongation was 210 kg. The reduction in the tensile tenacity, as compared with the above-mentioned calculated value, was 28.6%.

EXPERIMENTAL RESULTS

By using uncured composite strands each having a 3.0 mm outside diameter with an outside diameter of an FRP element thereof being 2.5 mm, structures of the same 1×7 type as in Example 1 were manufactured by the device shown in FIG. 1, with variations in the glass fiber content, the ratio of the twisting pitch to the outside diameter of the FRP element, the ratio of the tension on the side strand to the tension on the center strands in the twisting step, etc. Then, the structures thus obtained were sheathed with a low density polyethylene or nylon, obtaining eight samples. The following Table 1 shows the construction, production conditions and physical properties of the samples.

Figure 5:
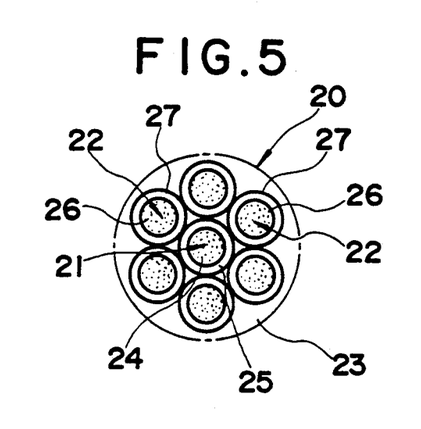
FIG. 5 is a sectional view of an FRP structure according to Example 3 of the invention.

To prepare the rod member 21, eleven E-glass rovings (RS28, 280 tex, a product by Nitto Boseki Co., Ltd.) were used as reinforcing fibers 24. The reinforcing fibers 24 were impregnated with an uncured unsaturated polyester resin (Ester H-8100, a product by Mitsui Toatsu Chemicals, Inc.), and were drawn to an outside diameter of 1.6 mm. After a coating 25 of a low-density polyethylene was provided on the periphery of the reinforcing fibers 24, the unsaturated polyester resin was cured at a temperature of 145° C. Finally, the outside diameter of the coating 25 was sized to 2.2 mm.

Figure 6:
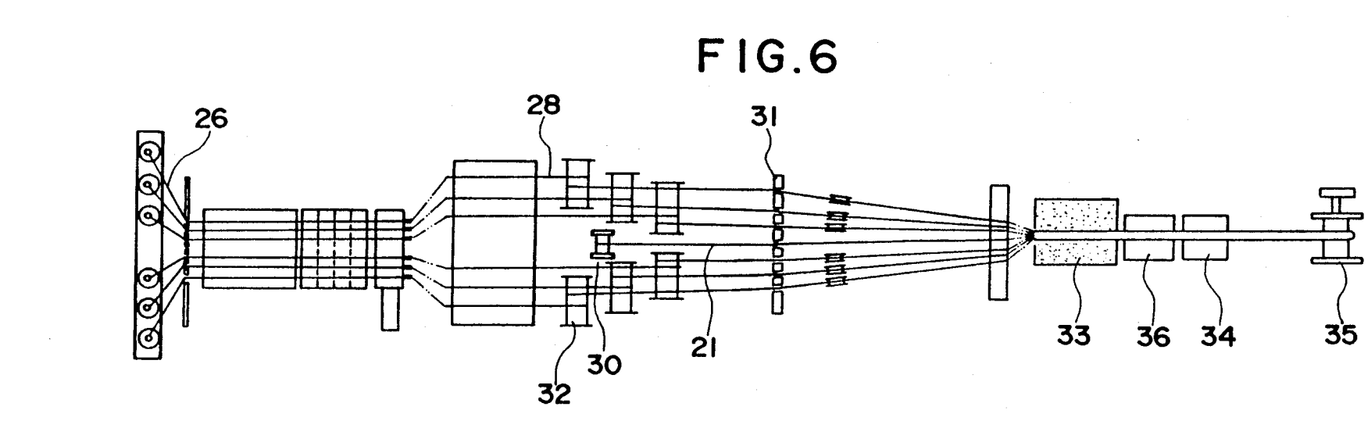
FIG. 6 is a plan view explanatory of a process according to another embodiment of the invention for manufacturing the FRP structure of Example 3.
Figure 7:
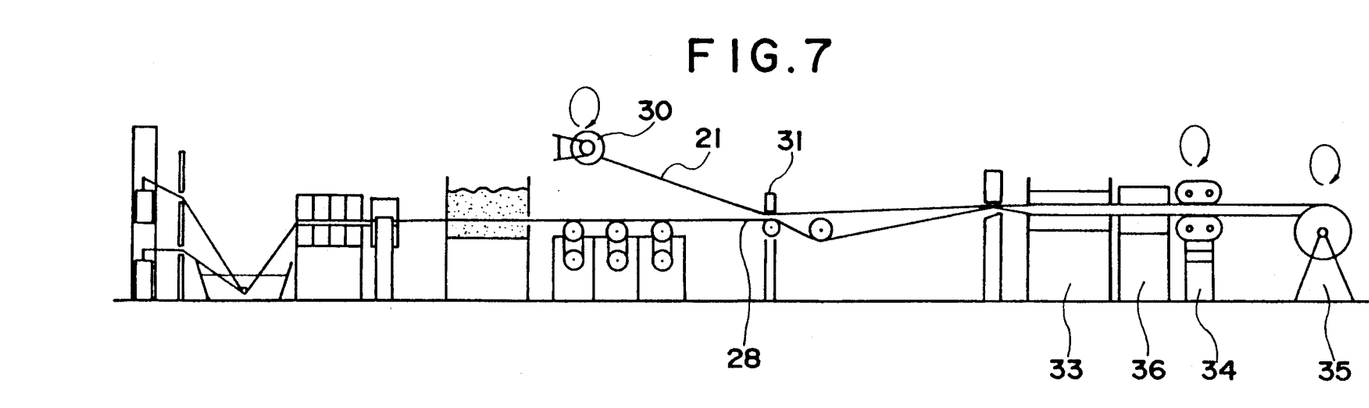
FIG. 7 is a side view thereof.

The side strands 22 were prepared as follows. Twelve glass rovings which were the same as those used in rod member 21 were used together with a single glass cake (made by Nippon Electric Glass Co., 80 tex) as reinforcing fibers 6, the unit weight of which was 3.44 g/m. The reinforcing fibers 26 were impregnated with an uncured unsaturated polyester resin (Ester H-8100, a product by Mitsui Toatsu Chemicals, Inc.), and were formed into an FRP element having an outside diameter of 1.7 mm. A coating 27 of a low-density polyethylene with an outside diameter of 2.2 mm was provided on the periphery of the FRP element to obtain a composite strand 28 (FIGS. 6 and 7). Such composite strands 28 were used as the side strands 22.

The above-mentioned structure 20 was manufactured by the process shown in FIG. 6 and FIG. 7. While a bobbin 30 with the above-mentioned rod member 21 wound thereon was rotated at 10 r.p.m., the rod member 21 was supplied to a central hole in a guide 31 under a tension of about 1.5 kg. On the other hand, six uncured composite strands 28 which were taken off respectively by six Nelson-type rollers 32 were supplied to six side holes in the guide 31 under a tension of about 2.0 kg. The rod member 21 and composite strands 28 passed

TABLE 1

| | | | | | Before sheathing | | PE sheath | | Ny sheath | |
|---|---|---|---|---|---|---|---|---|---|---|
| Unit | Coating | GC vol. % | Twisting pitch times | To/Tc | Min. bend diameter mm | Flexural rigidity g | Min. bend diameter mm | Flexural rigidity g | Min. bend diameter mm | Flexural rigidity g |
| Sample 1 | PE | 67.3 | 24 | 1/3 | 350 | (1900) | — | (2100) | — | (2400) |
| Sample 2 | | | 48 | | 260 | 2700 | 160 | 3000 | 210 | 3400 |
| Sample 3 | | | 96 | | 160 | 3050 | 170 | 3400 | 180 | 3700 |
| Sample 4 | | | 48 | 2/3 | 290 | (2300) | 200 | 3300 | — | — |
| Sample 5 | | | | 3/3 | 320 | (2200) | 230 | 3200 | 220 | 3300 |
| Sample 6 | | 62.8 | 48 | 1/3 | 220 | 2500 | 165 | 2800 | 190 | 3300 |
| Sample 7 | | 56.1 | | | 200 | 2000 | 160 | 2300 | 155 | 2700 |
| Sample 8 | Ny | 67.3 | 48 | 1/3 | 250 | 2800 | — | — | 170 | 3500 |

*Flexural rigidity is the force (g) required for bending the sample to a 270 mm diameter.
*Flexural rigidity value in parentheses is the force (g) required for bending the sample to a 400 mm diameter.

From the above results, it will be seen that the flexibility of the FRP structure is unsatisfactory when the twisting pitch is less than 25 times the outside diameter of the FRP element, that a preferred value of the tension on each side strand at the time of twisting is about one-third of the tension on the center strand (which was set at 3.7 kg), and that the flexibility of the FRP structure can be enhanced by providing the thermoplastic sheath.

EXAMPLE 3

This example was for obtaining an FRP structure 20 having a cross section as shown in FIG. 5. The structure 20 comprises a rod member 21 disposed at a central portion, and six side strands 22 twisted around the rod member 21 in the same direction at a twisting pitch of 150 mm, with a sheath 23 provided at the outermost portion of the structure 20.

through the guide 31 were led into a curing tank 33, where the composite strands 28 were twisted around the rod member 21 while curing the FRP elements in the strands. The twisting was carried out by taking up the composite strands and the rod member by a take-up device or twister 34 which was rotated at 10 r.p.m. in the same direction as the bobbin 30, so that no twisting stress was exerted on the rod member 21. The twisting pitch was set at 150 mm, equivalent to about 88 times the outside diameter (1.7 mm) of the FRP element, and the take-up speed was set at 1.5 m/min. The structure thus twisted and cured was drawn by a drum 35, which was rotated in the same direction and at the same rotational speed as the device 34. Then, a polyethylene sheath 23 was provided on the periphery of the structure by an extruder (not shown), followed by sizing whereby the structure finally had a circular cross section with an outside diameter of 7.5 mm. Numeral 36 denotes a hot air drier. The steps for obtaining each composite strand 28 were the same as in the above-mentioned Example, and the explanation thereof is omitted here.

EXAMPLE 4

Figure 8:
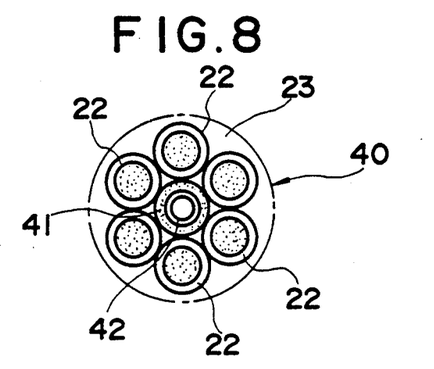
FIG. 8 is a sectional view of an FRP structure according to Example 4.

This example involves an FRP structure 40 a cross section of which is shown in FIG. 8. The structure 40 comprises a rod member 41 disposed at a central portion, and six side strands 22 twisted around the rod member 41 in the same direction at a twisting pitch of 150 mm.

Figure 9:
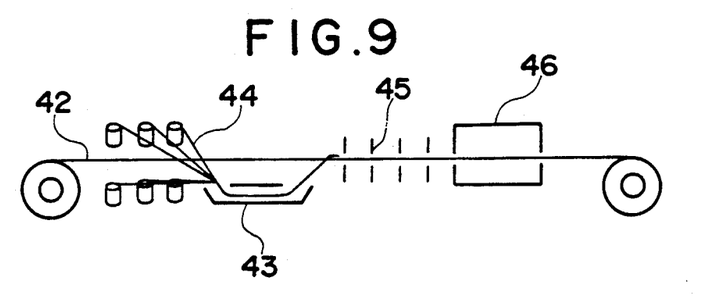
FIG. 9 is a view explanatory of a process for preparing a rod member used in the FRP structure of Example 4.

The rod member 41 was prepared by a process shown in FIG. 9 in which a pipe 42 preformed from a polycarbonate resin (Panlite, K-1300, a product by Teijin Chemicals, Ltd.) to have an outside diameter of 2.0 mm and an inside diameter of 1.4 mm was supplied. Twelve glass rovings (ER-280F-185, 280 tex, a product by Nippon Electric Glass Co.) 44 were introduced into a tank 43 filled with a UV-curable unsaturated polyester resin having a chemical affinity with the polycarbonate resin for impregnation and were supplied along the outer periphery of the pipe 42. The pipe 42 and the glass fibers 44 were then passed through a drawing guide 45 to have an outside diameter of 2.4 mm, and the resin was cured by an UV irradiation device 46 to obtain the rod member 41.

Around the pipe-shaped rod member 41 thus obtained, six composite strands 28 which were the same as those used in Example 3 were twisted at a twisting pitch of 150 mm while curing the FRP element by the same device as that shown in FIG. 6, followed by provision of the sheath 23.

EXAMPLE 5

Figure 10:
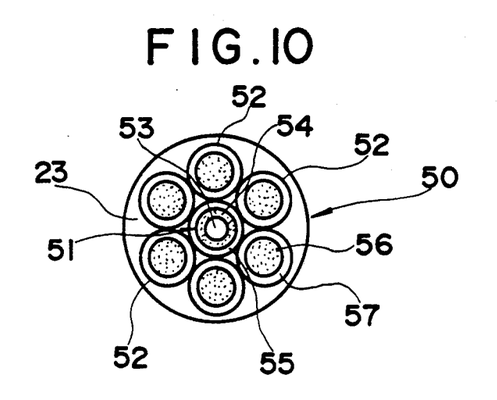
FIG. 10 is a sectional view of an FRP structure according to Example 5 of the invention.

This example was for obtaining an FRP structure 50 having a cross section as shown in FIG. 10. The structure 50 comprises a rod member 51 disposed at a central portion, and six side strands 52 twisted around the rod member 51 in the same direction at a twisting pitch of 150 mm.

The rod member 51 was formed by providing an FRP layer 54 comprising reinforcing fibers bound with a thermosetting resin on the outer periphery of a silicone-coated optical fiber 53 having 0.4 mm diameter so that the outside diameter of the FRP, layer 54 was 1.0 mm, and by providing a polyethylene sheath 55 on the FRP layer 54 to have a finished outside diameter of 1.8 mm.

Each of the side strands 52 was prepared as follows. Seven glass rovings (RS28, 280 tex, a product by Nitto Boseki Co., Ltd.) and a single 80-tex glass cake were jointly used as reinforcing fibers 56, the unit weight of which was 2.04 g/m. The reinforcing fibers 56 were impregnated with an uncured unsaturated polyester resin (Ester H-8100, a product by Mitsui Toatsu Chemicals, Inc.) to form an FRP element having an outside diameter of 1.3 mm. A sheath 57 of a low-density polyethylene was provided on the FRP element to form a composite strand with 1.7 mm outside diameter, which was used as the side strand 52.

The structure 50 was produced by use of the same device as in Example 1. In twisting, the tension on the rod member 51 was set at 1.5 kg as measured at the position of the guide 31, and the tension on each side strand 52 was set at 900 g. The twisting pitch was set at 150 mm, a value equivalent to about 115 times the outside diameter (1.3 mm) of the FRP element in the side strand 52. The structure 50 was finished by providing a thermoplastic resin sheath 23 having an outside diameter of 6.0 mm.

The construction and measured values of physical properties of the structures obtained in Examples 3 to 5 above are set forth in the following Table 2. With the same construction as in Example 3 except that the twisting pitch was set at 25 times, 40 times and 50 times the outside diameter of the FRP element in the side strand 22, the modulus of elasticity in tension of the structure 20 was 4,100 kg/mm$^2$, 4,400 kg/mm$^2$ and 4,550 kg/mm$^2$, respectively. On the other hand, when the twisting pitch was 20 times the outside diameter of the FRP element, the modulus of elasticity of such structure was 3,900 kg/mm$^2$.

TABLE 2

|  | EXAMPLE 3 | EXAMPLE 4 | EXAMPLE 5 |
|---|---|---|---|
| Outside diameter of sheath | 7.5 mm | 7.5 mm | 6.0 mm |
| Center strand | Cured FRP | Cured FRP*1 | Optical Compose |
|  | G-2.2 × 1.6 | G-2.4 × 2.0 × 1.4 | OFCP-G-1.8 × 1.0 |
| Side strands | G-2.2 × 1.7 | G-2.2 × 1.7 | G-1.7 × 1.3 |
| (six strands) | uncured | uncured | uncured |
| Twisting pitch (times) | 150 mm (88)*2 | ← (88)*2 | ← (115)*2 |
| 250 mm Flexural rigidity (g) | 1040 | 1500 | 410 |
| Tenacity (kg) | 2190 | 2150 | 1120 |
| Modulus of elasticity (kg/mm$^2$) | 4980 | 4870 | 5140 |

*1: Pipe-shaped body.
*2: The ratio of the twisting pitch to the outside diameter of FRP element in composite strand.

EXPERIMENTAL RESULTS

In order to see how the curing temperature for the FRP elements in the composite strands affects on the physical properties of the twisted structure, samples were prepared by variously changing the curing conditions and the thermoplastic resin material for the coating. Curing was carried out by passing the composite strands through a tank filled with a silicone oil. Each of the samples was a twisted structure of the 1×7 type, with no sheath. For these samples, the adhesive strength between the FRP element and the coating in the composite strand and the flexural rigidity of the twisted structure were measured, the results being shown in Table 3. The adhesive strength is measured by a so-called "180° peeling test" in which the force required for stripping the coating from the FRP element is measured in such a manner that a longitudinal portion was defined by a pair of slits in the coating to partly peel the portion from the FRP element and then both ends of the portion were pulled in opposite directions at a rate of 50 mm/min. The flexural rigidity is represented by the force, measured by an electric balance, required for bending a 400 mm long piece of each sample into a semicircular shape with a diameter of 250 mm.

The results indicate that the curing temperature be set below the softening point of the thermoplastic resin material forming the coating, in order to maintain the adhesive strength between the FRP element and coating at a low level and subsequently to achieve a low flexural rigidity.

TABLE 3

| Resin of coating (softening point) | Curing conditions | Adhesive strength (g) | Flexural rigidity | FRP element |
|---|---|---|---|---|
| LLDPE | 95° C. × 15 min | 10 | 350 g | G-1.7 × 1.3 |
| Mg 211 | 80° C. × 24 hrs | | | |
| (97° C. | 110° C. × 10 min | 117 | 600 g | |
| | 120° C. × 5 min | 123(100~150) | 1 kg | |
| | 130° C. × 5 min | 139(107~158) | 1 kg | |
| | 140° C. × 5 min | 550 | 1 kg | |
| LLDPE | 120° C. × 5 min | 130(110~158) | 1 kg | G-1.7 × 1.3 |
| Dowlex 2045 | 130° C. × 5 min | 141(95~205) | | |
| (100° C.) | | | | |
| LLDPE | 110° C. × 10 min | 25 | 400 g | G-1.7 × 1.3 |
| Dowlex 2042 | 120° C. × 5 min | 129 | 600 g | |
| (112° C.) | 130° C. × 5 min | 244 | 1 kg | |
| LLDPE | 110° C. × 10 min | 20 | 350 g | |
| Dowlex 2037 | 120° C. × 5 min | 25 | 450 g | |
| (118° C.) | 130° C. × 5 min | 110 | 1 kg | |
| NY-12 | 140° C. × 2 min | 30 | 440 g | G-1.7 × 1.3 |
| Diamid L-2121 | | | | |
| (172° C.) | | | | |

As will be understood from the above description, the twisted FRP structure produced according to the invention can maintain the tensile strength at a satisfactory level with the flexibility necessary for practical use. The flexibility may be further enhanced by providing the sheath. The process according to the invention makes it possible to manufacture a twisted FRP structure efficiently, as compared with the conventional method in which the twisting step and the subsequent curing step and the like have been carried out discontinuously in steps separate from the production of the composite strands. In addition, the process of the invention overcomes the problems involved in the conventional method, such as the problems in storage stability of uncured composite strands, lowering of physical properties, etc.

The FRP structure produced according to the invention may be used, with or without the sheath thereon, as a tension member for an optical fiber supporting spacer, which is a component of an optical fiber cable. Also, the FRP structure can be used as a tension member having high tensile strength and flexibility, for instance by providing the sheath on the structure, forming the sheath into a true-circular cross sectional shape and disposing an optical fiber unit spirally around the sheath of the structure. Thus, the FRP structure of the invention is extremely useful. Besides, where the central rod member comprises a pipe, it is possible to insert an optical fiber therein. Furthermore, the structure shown in FIG. 10 can be used as an armored-type optical fiber cord having high tensile strength and flexibility, for exterior or interior wiring.

Although the present invention has been described with reference to preferred embodiments and examples thereof, many modifications and alterations may be made within the spirit of the invention.

What is claimed is:

1. A process for manufacturing a twisted FRP structure, said process comprising the continuous steps of:

forming a plurality of strands each comprising a number of long fibers;

obtaining uncured FRP elements by impregnating each said strand with an uncured thermosetting resin and forming each impregnated strand into a predetermined shape;

passing each said uncured FRP element through a die portion of a melt extruder to provide an annular coating of thermoplastic resin thereon;

cooling immediately said coatings and thereby forming composite strands having solid coatings with said FRP elements remaining uncured;

in succession to said cooling and forming step, selecting one of said composite strands as a center strand and the remaining of said composite strands as side strands and twisting said side strands around said center strand at a predetermined twisting pitch to provide a twisted FRP composite; then providing a thermoplastic resin sheath around said twisted FRP composite; and thereafter curing said FRP elements in all said composite strands.

2. A process as claimed in claim 1, wherein said twisting of said composite strands is conducted with a tension on each said side strand set to be less than a tension on said center strand.

3. A process as claimed in claim 1, wherein said curing of said FRP elements in said composite strands is carried out at a temperature below a softening point of said thermoplastic resin coatings of said composite strands.

4. A process as claimed in claim 1, further comprising a step of sizing said sheath by heating after said curing of said FRP elements.

5. A process for manufacturing a twisted FRP structure, said process comprising the continuous steps of:

forming a plurality of strands each comprising a number of long fibers;

obtaining uncured FRP elements by impregnating each said strand with an uncured thermosetting resin and forming each impregnated strand into a predetermined shape;

passing each said uncured FRP element through a die portion of a melt extruder to provide an annular coating of a thermoplastic resin thereon;

cooling immediately said coatings and thereby forming composite strands having solid coatings with said FRP elements remaining uncured;

supplying a center strand comprising a preliminarily cured rod member made of a fiber-reinforced synthetic resin;

in succession to said cooling and forming step, twisting said composite strands around said center strand at a predetermined twisting pitch to provide a twisted FRP composite; then providing a thermoplastic resin sheath around said twisted FRP composite; and thereafter curing said FRP elements in said strands.

6. A process as claimed in claim 5, comprising maintaining a tension T on each of said composite strands during said twisting step that satisfies the following equation in which W is a unit weight (g/m) of said reinforcing fibers used in said composite strands:

$$T \geq (9000 \times W \times 0.05)/3 \qquad (g).$$

7. A process as claimed in claim 5, wherein said curing of said FRP elements in said composite strands is carried out at a temperature below a softening point of said thermoplastic resin coatings of said composite strands.

8. A process as claimed in claim 5, further comprising a step of sizing said sheath by heating after said curing of said FRP elements.

* * * * *